United States Patent [19]

Acda et al.

[11] Patent Number: 4,457,886
[45] Date of Patent: Jul. 3, 1984

[54] PROCESS FOR THE PRODUCTION OF COUPLING PIECES FROM A THERMOPLASTIC, AND DEVICE FOR CARRYING OUT THIS PROCESS

[75] Inventors: Petrus M. Acda; Jacob Karreman, both of Enkhuizen, Netherlands

[73] Assignee: Polva-Nederland B.V., Enkhuizen, Netherlands

[21] Appl. No.: 102,654

[22] Filed: Dec. 12, 1979

[30] Foreign Application Priority Data

Dec. 12, 1978 [NL] Netherlands ...................... 7812064
Dec. 12, 1978 [NL] Netherlands ...................... 7812065

[51] Int. Cl.³ .............................................. B29C 7/00
[52] U.S. Cl. ................................... 264/249; 264/318; 264/296
[58] Field of Search ...................... 264/318, 249, 296

[56] References Cited

U.S. PATENT DOCUMENTS

4,006,757  2/1977  Acda et al. ......................... 425/393
4,113,813  9/1978  Wilson ................................. 264/296
4,127,632  11/1978  Anger ................................ 264/318

*Primary Examiner*—James H. Derrington

*Attorney, Agent, or Firm*—Spencer & Frank

[57] ABSTRACT

The invention relates to a process for the production of coupling pieces which possess an undercut annular groove optionally provided with a sealing ring, in which process a sleeve, having an internal diameter which increases in steps towards the open end, is initially preformed, the terminal part of the sleeve is postformed in order to form the annular groove, after having optionally introduced a sealing ring into the preformed sleeve, and, during preforming, only the terminal part of the preformed sleeve is kept at the deformation temperature and the remainder of the preformed sleeve is cooled, the terminal part of the preformed sleeve being cooled after postforming.

The device according to the invention comprises a forming mandrel, the front part of which possesses a cooling chamber and the rear part of which possesses heating means, a postforming ring, which can move radially and axially and is equipped with a cooling chamber, and optionally a moulding sheath, a closing ring, which is equipped with heating means, and a member for introducing the sealing ring, which member can move radially and axially.

4 Claims, 17 Drawing Figures

PROCESS FOR THE PRODUCTION OF COUPLING PIECES FROM A THERMOPLASTIC, AND DEVICE FOR CARRYING OUT THIS PROCESS

BACKGROUND OF THE INVENTION

The present invention relates to a process for the production of coupling pieces from a thermoplastic, which coupling pieces possess an undercut annular groove optionally enclosing a sealing ring, in which process a sleeve, having an internal diameter which increases in steps in the direction of the free end, is initially performed on the hot end of a pipe made of a thermoplastic, the terminal part of the preformed sleeve is then postformed in order to form the undercut annular groove, and, finally, the postformed sleeve is cooled, and also relates to an improved device for carrying out this process.

Processes of this type have already been described in Dutch Patent Applications Nos. 74/08,627 and 74/08,628, filed in the name of WAVIN B. V., and in Dutch Patent Application No. 72/09,328, filed in the name of FORSHEDA IDEUTVECKLING A. B., and also in Swiss Pat. No. 490,956, filed in the name of KUNSTSTOFFWERK GEBRÜDER ANGER G.m.b.H. and Co.

In these processes, the preformed sleeve obtained in the first stage is either heated completely for the purpose of postforming, or is kept entirely at the forming temperature and postformed. These processes can therefore give rise to variations in the dimensions of the coupling pieces formed, or to the appearance of internal stresses in the walls of the sleeves thus obtained.

SUMMARY OF THE INVENTION

The invention relates to a process which does not exhibit these disadvantages and which makes it possible continuously to produce coupling pieces in a simpler and more efficient manner, whilst at the same time making it possible to improve the quality.

The invention therefore relates to a process for the production of coupling pieces from a thermoplastic, which coupling pieces possess an undercut annular groove, in which process a sleeve, having an internal diameter which increases in steps in the direction of the free end, is performed on the end of a pipe made of a thermoplastic, the terminal part of the preformed sleeve is postformed in order to form the undercut groove, and the postformed sleeve is cooled, and, during preforming, the terminal part of the preformed sleeve is kept at a temperature which is such that the said terminal part remains elastically deformable, whilst the remainder of the preformed sleeve is cooled to a temperature which is such that the said remainder is no longer deformable.

By producing the coupling pieces using this direct process, the production costs are reduced by eliminating additional costs for transportation, labour and finishing, whilst the heating for the purpose of forming can be equilibrated and homogeneous, which prevents the appearance of internal stresses in the moulded terminal part.

In the process according to the invention, the preforming is carried out by a process involving the widening of the end of a pipe or a pipe section, which has been heated beforehand, or also by an injection-moulding process.

In a particular embodiment of the process according to the invention, it is possible directly to produce coupling pieces in which the undercut annular groove encloses a sealing ring. For this purpose, it suffices to introduce a sealing ring into the terminal part of the preformed sleeve and then to postform this terminal part around the sealing ring so as to form the undercut annular groove enclosing this sealing ring.

In this case, the process according to the invention exhibits the advantage that it does not depend absolutely on the shape and on the mechanical and physical properties, such as the hardness, the heat resistance, the elasticity and the like, of the sealing ring. It is therefore possible to obtain coupling pieces of various shapes, which contain sealing rings also of various shapes.

The present invention also relates to a device for carrying out the process, which device can form the subject of numerous modified embodiments.

This device is distinguished from the devices already used by the fact that it comprises a forming mandrel which can move axially in the open end of the pipe to be preformed, and the diameter of which increases in steps from a minimum value at its free end to a maximum value on its rear part, the front part of the mandrel possessing an internal chamber for the circulation of a cooling fluid and the rear part possessing heating means.

Thus, during the preforming of the sleeve, the terminal part of the preformed sleeve can be kept at the elastic deformation temperature by virtue of heating means provided on the rear part of the forming mandrel, whilst the remaining part of the sleeve can simultaneously be cooled to a temperature below its deformation temperature by circulating a cooling fluid in the internal chamber provided in the front part of this same mandrel.

The heating means on the rear part of the forming mandrel can be of any type. In particular, they can consist of an internal chamber which is independent of the internal chamber provided at the front part of the mandrel, and which can be connected to a source of heating fluid, or they can also consist of an external sheath containing an element for heating by means of resistance. It is obviously necessary to provide thermal insulation, for example by means of a layer of air, between the cooled part of the forming mandrel and the part which is kept hot.

In another embodiment of the device according to the invention, the forming mandrel can be provided with channels which emerge on its periphery and which can be connected to a source of vacuum. In this embodiment, the sleeve is preformed by causing the vacuum to act on the circumference of the forming mandrel, and this ensures perfect contact between the said sleeve and the said forming mandrel and consequently ensures more easily controllable cooling and temperature maintenance at the various parts of the preformed sleeve.

The device according to the invention also comprises a postforming ring which can move axially and radially between a rest position and a working position and which, in the working position, delimits a postforming space together with the forming mandrel, the said postforming ring being provided with an internal chamber for the circulation of a cooling fluid.

In a preferred embodiment, the device according to the invention comprises a collar for clamping the pipe to be treated, which collar can move axially, relative to the forming mandrel, and preforming is then carried out by means of relative displacement between the clamping collar, enclosing the pipe, and the forming mandrel.

In another preferred embodiment of the device according to the invention, the said device also comprises a forming sheath and a closing ring, which can move, relative to the forming mandrel, between a rest position and a working position and which, in the working position, delimit a preforming space together with the forming mandrel, the moulding sheath being provided with an internal chamber for the circulation of a cooling fluid and the closing ring being provided with heating means.

This last embodiment is particularly suitable for the production of coupling pieces having relatively high wall thicknesses, in which coupling pieces the thinning of the walls, caused by widening, can be compensated or even over-compensated by forcing more material in.

In another embodiment of the device according to the invention, the postforming ring is provided with a bearing surface, which cooperates with the forming mandrel, and carrying members, which cooperate with carrying members coupled to the forming mandrel.

This embodiment permits particularly simple control of the displacements of the postforming ring. After preforming the sleeve and withdrawing this sleeve from the forming mandrel, the forming ring is placed, by radial displacement, for example by means of a hydraulic cylinder, in the trajectory of the forming mandrel, that is to say between the preformed sleeve and the end of the forming mandrel. By subsequent displacement of the forming mandrel in the direction of the preformed sleeve, this mandrel comes into contact with the bearing surface of the postforming ring, and the latter is carried into the working position by the forming mandrel. After postforming, and cooling the postformed part of the sleeve, the forming mandrel is withdrawn from the postformed sleeve and carries the postforming ring with it by means of the carrying members.

In another embodiment of the device according to the invention, which can be used in the case where it is desired directly to produce coupling pieces in which the undercut annular groove encloses a sealing ring, the said device also comprises a member for introducing the sealing ring, which member can move axially and radially and intervenes between the preforming and postforming operations in order to introduce a sealing ring into the terminal part of the preformed sleeve.

The member for introducing the sealing ring can be constructed in such a way that it only acts as a support for holding the sealing ring, which is to be introduced, in a position such that the said sealing ring can be seized by the forming mandrel and introduced, by the latter, into the terminal part of the sleeve.

In another embodiment, which is preferred, the member for introducing the sealing ring is annular and possesses a support surface for the sealing ring, a bearing surface which cooperates with the forming mandrel, and carrying members which cooperate with carrying members coupled to the forming mandrel. In this embodiment, it is possible to achieve simple control of the displacement of the member for introducing the sealing ring, and to achieve rapid and reliable positioning of the sealing ring in the terminal part of the preformed sleeve without the risk of subsequent movement of this ring. In fact, in this embodiment, it suffices radially to place the introducing member between the forming mandrel, withdrawn from the preformed sleeve, and the said sleeve, for example by means of a hydraulic unit. On subsequent displacement of the forming mandrel towards the preformed sleeve, the latter comes into contact with the bearing surface of the introducing member and carries the latter into the preformed sleeve, with the result that the sealing ring resting on the support surface of the introducing member is positioned in the terminal part of the preformed sleeve. Consequently, on subsequent withdrawal of the forming mandrel from the preformed sleeve, the member for introducing the sealing ring is also removed from the preformed sleeve by means of the carrying members, leaving the sealing ring positioned in the terminal part of the preformed sleeve.

The process and the device according to the invention are furthermore explained in greater detail in the description of certain embodiments which now follows and which is given purely by way of illustration.

BRIEF DESCRIPTION OF THE DRAWINGS

In the following description, reference will be made to the figures in the attached drawings, in which.

DESCRIPTION OF THE PREFERRED EMBODIMENTS

Figure 1:
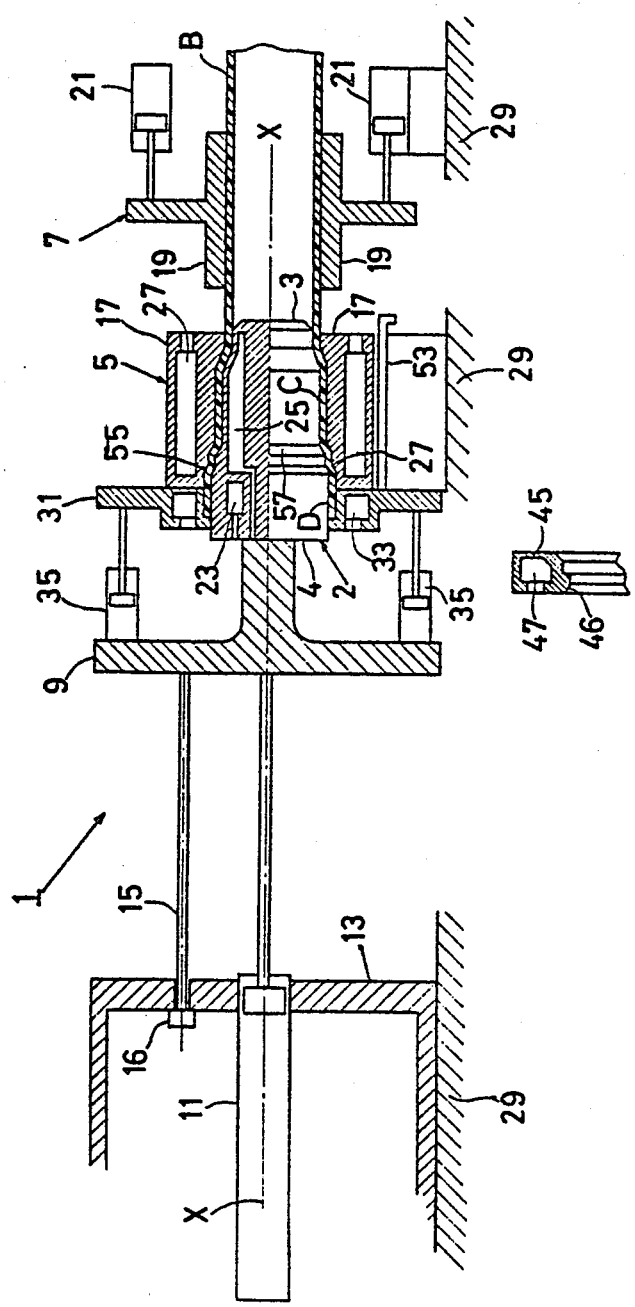
FIG. 1 is a view, in elevation and in section, of a device according to the invention, during the preforming of the sleeve on the end of a pipe made of a thermoplastic.

The device illustrated in FIGS. 1 to 4 essentially comprises a forming mandrel 2, having a diameter which increases in steps from its front end 3 to its rear part 4, a forming sheath 5 and a clamping collar 7. The forming mandrel 2 is rigidly joined to a plate 9. By means of a hydraulic cylinder 11, which is fixed in a casing 13, the plate 9 and the forming mandrel 2 can move axially along the axis XX of the device. The position of the forming mandrel 2, which forming mandrel is shown in the working position in FIG. 1, is precisely determined by the stop 16 mounted on a rod 15 integral with the plate 9. The forming sheath 5 comprises two forming shells 17 which are separated by a radial plane and can be moved relative to one another in the radial direction by manual, pneumatic, hydraulic or electrical means which are not shown. The clamping collar 7 consists of two clamping shells 19 which are separated by a radial plane and which can be moved relative to one another in the radial direction by means which are not shown, and can be moved together in the axial direction by means of hydraulic cylinders 21. The forming mandrel is provided, on its front part 3, with a circulation chamber 25 for the circulation of a heating or cooling fluid, and, on its rear part 4, with a heating chamber 23.

The two forming shells 17 are provided with a circulation chamber 27.

The fixed parts of the device, and in particular its frame, are only sketched and are designated in general by reference number 29. The device also comprises a closing ring 31 which is provided with a heating chamber 33 and which can move axially, relative to the plate 9 and to the forming mandrel 2, through the intervention of a hydraulic cylinder 35.

The device also comprises a postforming ring 45 possessing an annular bearing surface 46 and a cooling chamber 47. This ring can move in the radial direction by means of a connecting rod 50 which is coupled to a hydraulic cylinder 49. The postforming ring 45 is also equipped with a carrying member 51 capable of cooperating with a second carrying member 53 which is fixed to the closing ring and is coupled to the forming mandrel 2 via the plate 9.

The device which has now been described functions as follows.

To produce a coupling piece A on the end of the pipe B made of a thermoplastic, the forming mandrel 2, the forming sheath 5 and the closing ring 31 are heated by circulating a hot fluid in the chambers 23 and 25 of the mandrel, in the chamber 27 of the sheath and in the chamber 33 of the closing ring.

At the same time, that end of the pipe B on which work is to be carried out is also heated so that the thermoplastic is elastically deformable. After this, as soon as the pipe B has been fixed in the clamping collar 7 so that the hot terminal part of the pipe B is level with the forming sheath 5, this sheath is closed around the end of the pipe B.

The forming mandrel 2 and the closing ring 31 are then brought into the working position illustrated in FIG. 1, in which position the forming mandrel, the forming sheath and the closing ring 31 delimit a preforming space. In this stage, the hot end of the pipe B is preformed to give a part of the sleeve C, the diameter of which increases in steps in the direction of its free end, and the maximum diameter of which is at this end.

By axial displacement of the clamping collar 7 in the direction of the forming mandrel 2, the hot end of the pipe B undergoes compression and the preforming space is thus completely filled with thermoplastic.

Figure 2:
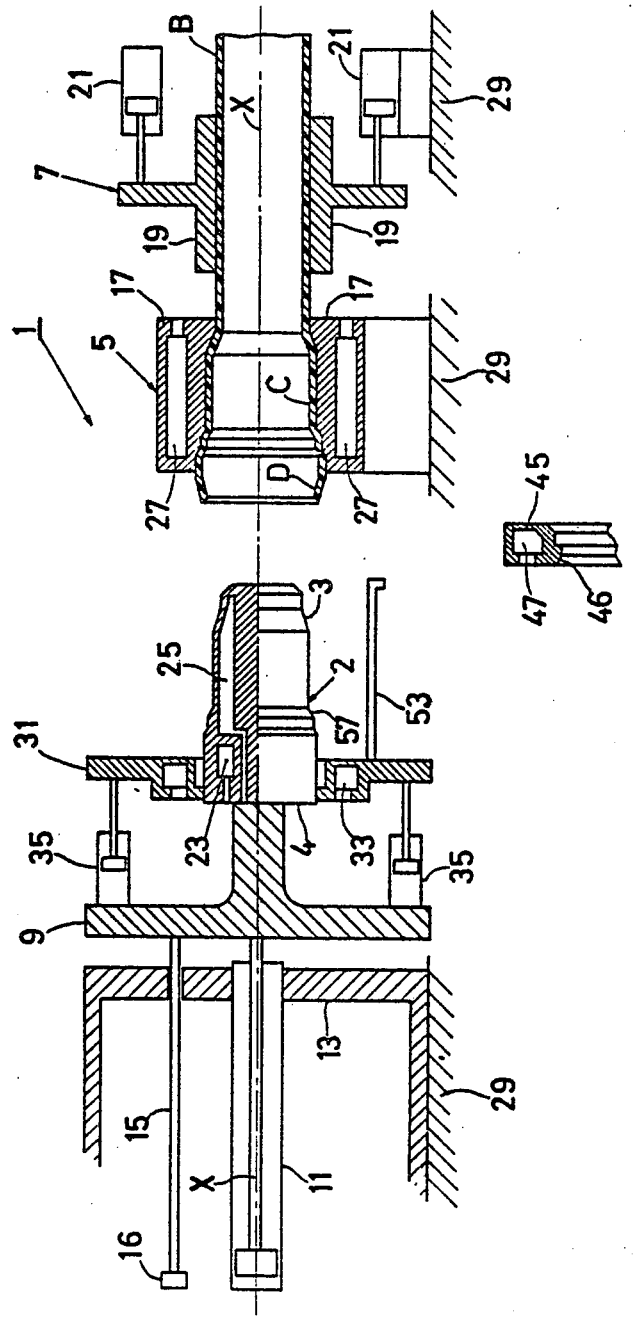
FIG. 2 is a view, in elevation and in section, of the device according to FIG. 1, in the position after the preforming of the sleeve.
Figure 3:
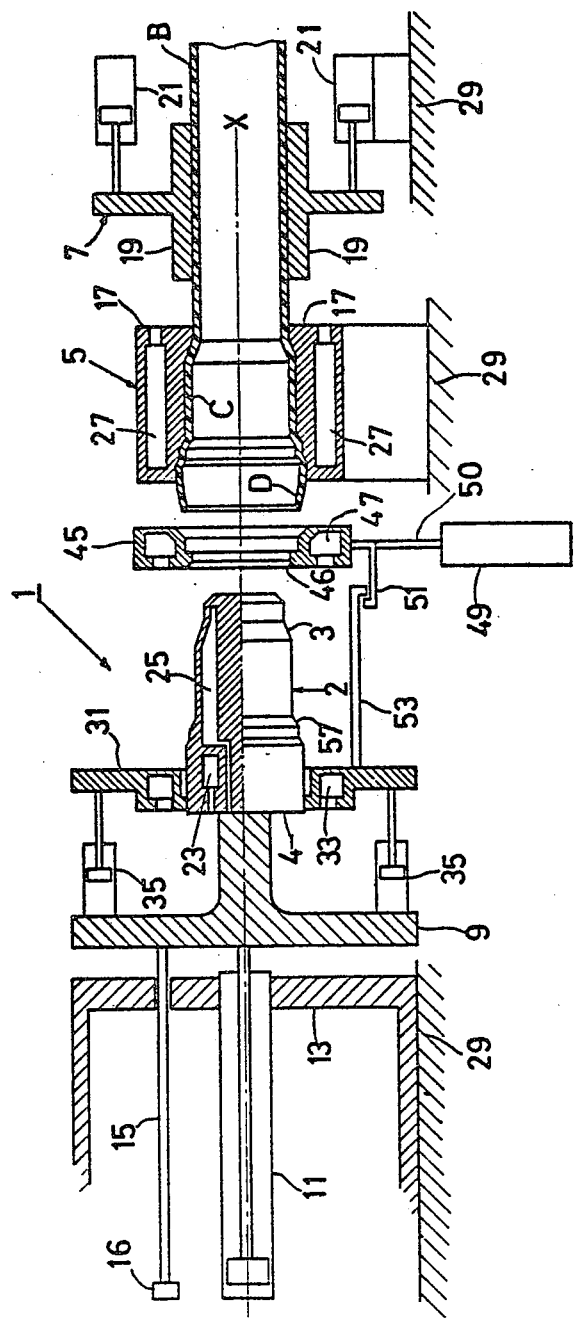
FIG. 3 is a view, in elevation and in section, of the device according to FIG. 1, in the position before the positioning of the terminal part of the sleeve.

Subsequently, the hot fluid circulating in the chamber 25 of the forming mandrel 2 and in the chamber 27 of the forming sheath 5 is replaced by a cooling fluid, whilst the circulation of hot fluid is maintained in the chamber 23 of the forming mandrel 2 and in the chamber 33 of the closing ring 31. Thus, on the one hand, that part of the preformed sleeve C which is surrounded by the chambers 25 and 27 is cooled so that the said part is no longer deformable, and, on the other hand, the widened part D of the sleeve, which is surrounded by the chambers 23 and 33, is kept at a temperature which is such that the said widened part remains deformable. The forming mandrel 2 is then withdrawn from the sleeve C, preformed in this way, and is returned to the rest position together with the closing ring 31. This situation is shown in FIG. 2. It is seen that the deformable end D of the sleeve has become somewhat narrower because it is no longer supported by the mandrel, but this narrowing is minimised by the fact that the rear part of the preformed sleeve has become rigid.

The postforming ring 45 is then brought radially into the free space between the end of the forming mandrel 2 and the forming sheath 5 by means of the hydraulic cylinder 49 and the connecting rod 50. In this intermediate state illustrated in FIG. 3, the axis of the postforming ring virtually coincides with the axis XX of the device.

Subsequently, the forming mandrel 2 and the closing ring 31 are again displaced axially in the direction of the forming sheath 5. Thus, the bearing surface 46 of the postforming ring 45 comes into contact with the surface 57 on the external part of the forming mandrel 2, and this ring is then carried axially by the forming mandrel from its intermediate position illustrated in FIG. 3 to its working position illustrated in FIG. 4, in which working position this ring and the forming mandrel 2 delimit a postforming space 59. During this displacement, the forming mandrel 2 is first inserted in the part C of the sleeve, and the internal circumference of the postforming ring 45 then comes into contact with the plastic, which is still hot and deformable, of the terminal part D of the sleeve, which terminal part is located in the postforming space and which is thus brought into the desired final shape.

During this shaping, the forming ring is also cooled by circulating a cooling medium in its chamber 47, with the result that the postformed terminal part D is cooled and rendered undeformable. The coupling piece which is finally obtained is in fact shown in FIG. 4.

Finally, the forming mandrel 2 is again withdrawn from the postformed sleeve and is returned to the rest position together with the closing ring 31. In this movement, the postforming ring 45 is carried along axially and returned to its intermediate position by means of the carrying member 53 which cooperates with the carring member 51. As soon as it has reached this position, the postforming ring 45 can be returned radially to its rest position by means of the hydraulic cylinder 49 and the connecting rod 50. After opening the forming sheath 5 and the clamping collar 7, the coupling piece formed can be withdrawn from the device. The device 1 is then in the position illustrated in FIG. 1 and can be used to produce a further coupling piece after its preforming elements have been heated.

The device which has now been described is particularly suitable for the forming of coupling pieces which have a relatively large wall thickness and/or in which the thinning of the wall, due to the increase in diameter, is compensated or over-compensated by forcing more material in, the wall thickness in fact being fixed by the height, viewed in the radial direction, of the preforming space 55 and the postforming space 59.

Figure 4:
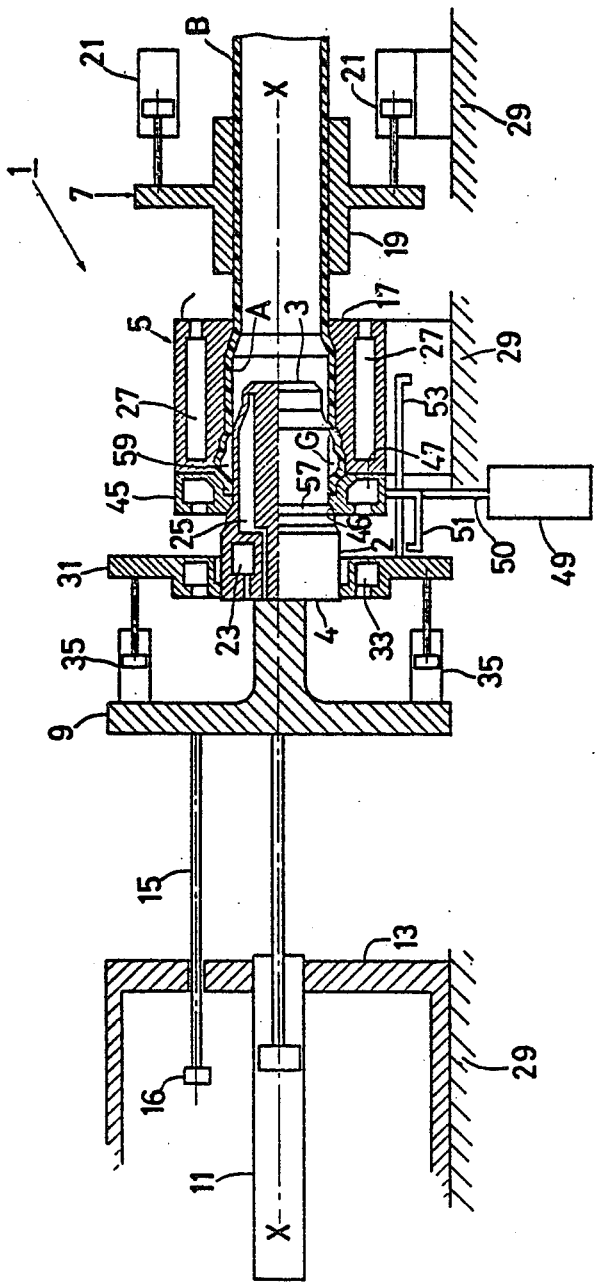
FIG. 4 is a view, in elevation and in section, of the device according to FIG. 1, during the postforming of the terminal part of the sleeve.
Figure 5:
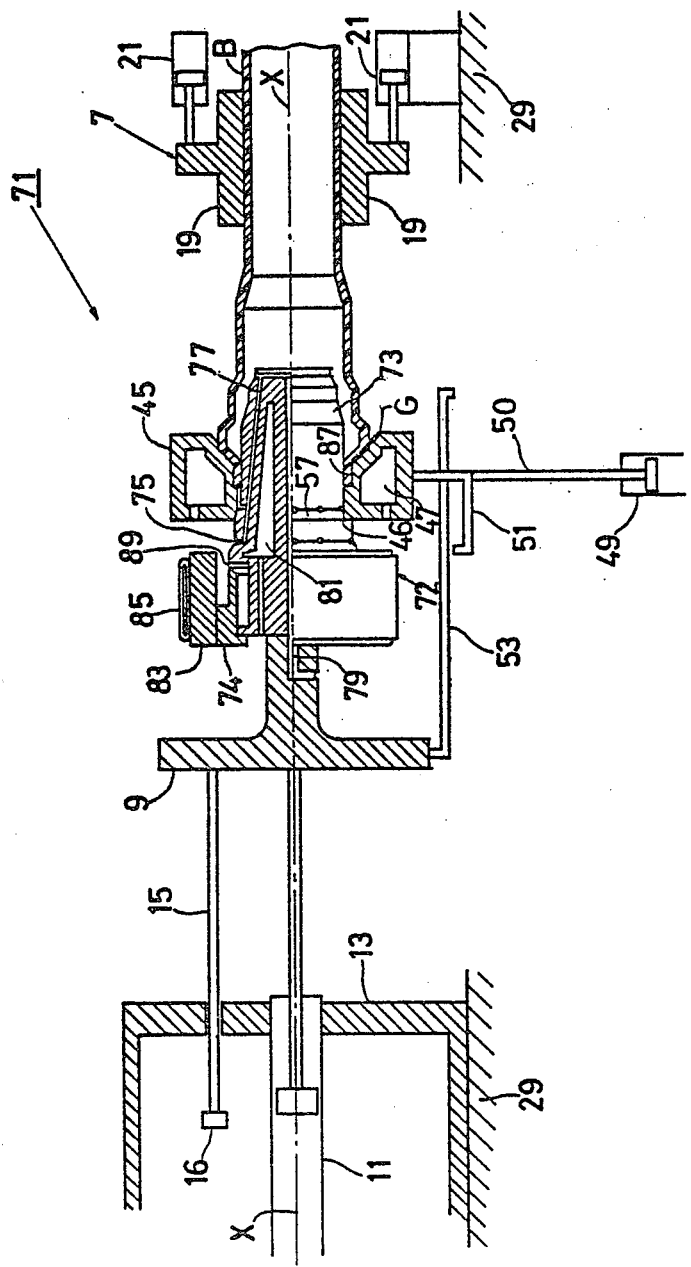
FIG. 5 is a view, in elevation and in section, of another device according to the invention.

To produce coupling pieces which have a relatively low wall thickness and/or for which it is not desired or necessary to compensate the wall thinning, it is possible, in order to carry out the process according to the invention, to use another embodiment of the device, which is shown in FIG. 5. In this FIG. 5, elements which are identical to those in FIGS. 1 to 4 are designated by an identical reference number.

As is apparent from this FIG. 5, the device 71 comprises a forming mandrel 72 provided with channels 75 which emerge on its external circumference and which are linked to a common channel 77 which is connected, via a central passage 79, to a source of vacuum which is not shown.

The forming mandrel 72 is provided, in its front part, with a cooling chamber 81, and it is equipped, on its rear part, with a heating sheath 83 externally surrounded by an element 85 for heating by means of resistance. The device according to this embodiment does not comprise a forming sheath.

The other elements of the device are similar to those which have already been described with reference to the device relating to FIGS. 1-4.

In the device which has now been described, the preforming of the sleeve is carried out pneumatically.

For this purpose, that end of the pipe B on which work is to be carried out is also heated so that the thermoplastic is deformable, and the pipe B is then fixed in the clamping collar 7. By relative and axial displacement of the forming mandrel 72 and the clamping collar 7, the mandrel 72 is brought into the heated end of the pipe B, and the said end is deformed according to the external profile of this mandrel. A vacuum is then applied to the external circumference of the forming mandrel 72 via the channels 75, 77 and 79, and the terminal part of the pipe is thus shaped in the desired manner to give a sleeve C, the diameter of which increases in steps in the direction of its free end, and the terminal part D of which is widened as shown in FIG. 1.

By circulating a cooling fluid in the chamber 81 of the forming mandrel 72, the preformed part of the sleeve at the level of this chamber is cooled and rendered undeformable, whilst the terminal part D of the preformed sleeve is kept at a temperature which is such that the said terminal part remains deformable, by the element 85 for heating by means of resistance, and by the sheath 83.

As is apparent from FIG. 5, the heated rear part 74 of the forming mandrel is thermally insulated from the cooled front part, for example by means of a layer of air 89.

The remainder of the mode of operation of this device is identical to that described for the device according to FIGS. 1-4.

FIG. 5 shows the device in the postmoulding stage and can therefore be compared with FIG. 4. The postforming ring 45 is in the working position and delimits a postforming chamber together with the forming mandrel 72.

FIGS. 6 to 10 illustrate another embodiment of the device according to the invention, which embodiment is suitable for the production of coupling pieces which are directly equipped with a sealing ring R enclosed in the undercut annular groove.

This device essentially comprises a forming mandrel 2, the diameter of which increases in steps from the front end 3 to the rear part 4, a clamping collar 7, a forming sheath 5 and a closing ring 31, and these are constructed in the same manner as for the device according to FIGS. 1-4. This device also comprises a member 37 for introducing the sealing ring, which member is provided with an annular bearing surface 38 and a support surface 36 for the sealing ring R. This member 37 can be radially displaced by means of the hydraulic cylinder 39 and the connecting rod 40. Moreover, this member 37 is equipped with a carrying member 41 which can cooperate with a carrying member 43 fixed to the closing ring 31. The device also comprises a postforming ring 45 which is provided with an annular bearing surface 46 and a cooling chamber 47. This ring 45 can move radially by means of a rod 50 coupled to a hydraulic cylinder 49, and it is provided with a carrying member 51 which can cooperate with a carrying member 53 fixed to the closing ring.

The device functions in the following manner.

Figure 6:
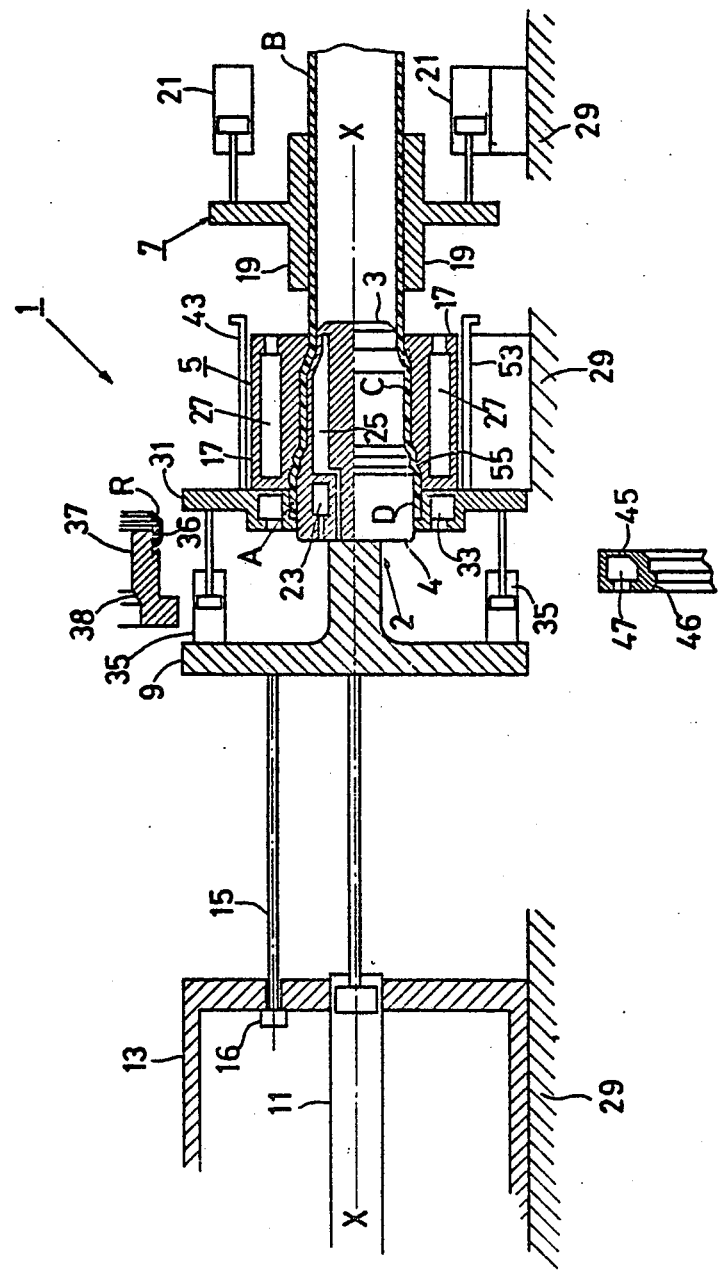
FIG. 6 is a view, in elevation and in section, of a third device according to the invention, which makes it possible to position a sealing ring, the device being shown during the preforming of the sleeve.

The preforming of the sleeve C is carried out in an identical manner to that described with reference to the device according to FIGS. 1 and 2, which correspond to FIGS. 6 and 7.

Figure 7:
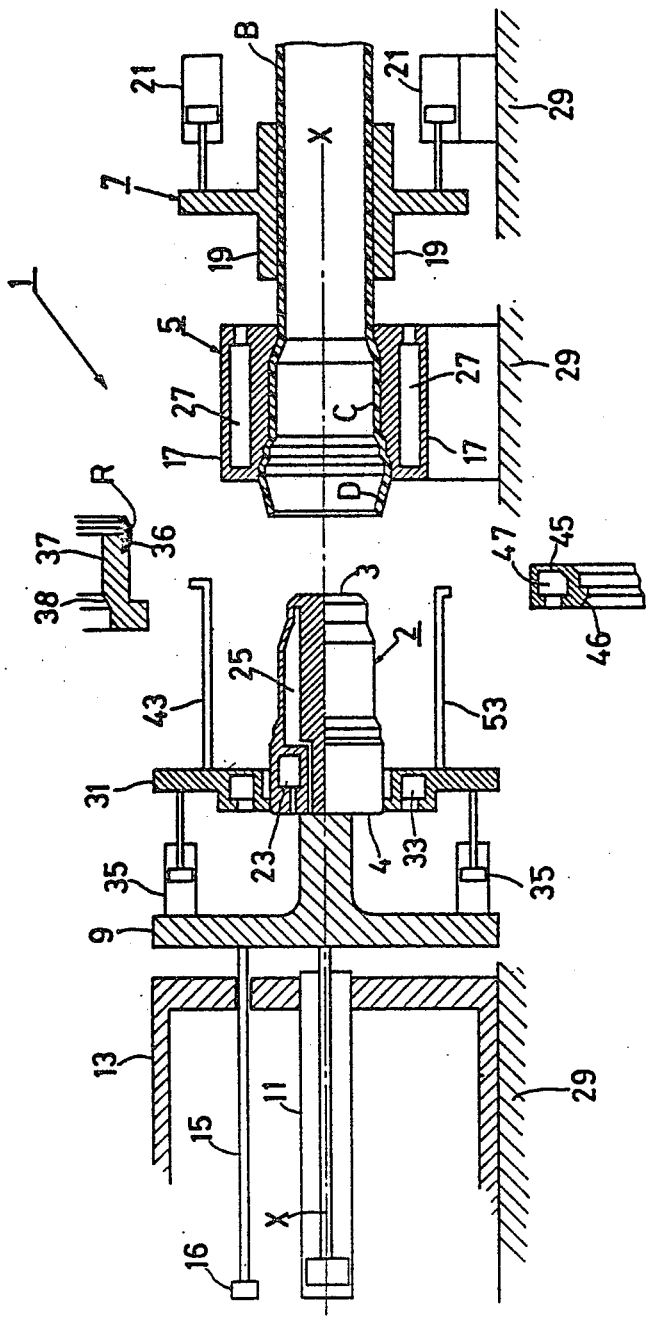
FIG. 7 is a view, in elevation and in section, of the device according to FIG. 6, in the position after the preforming of the sleeve.
Figure 8:
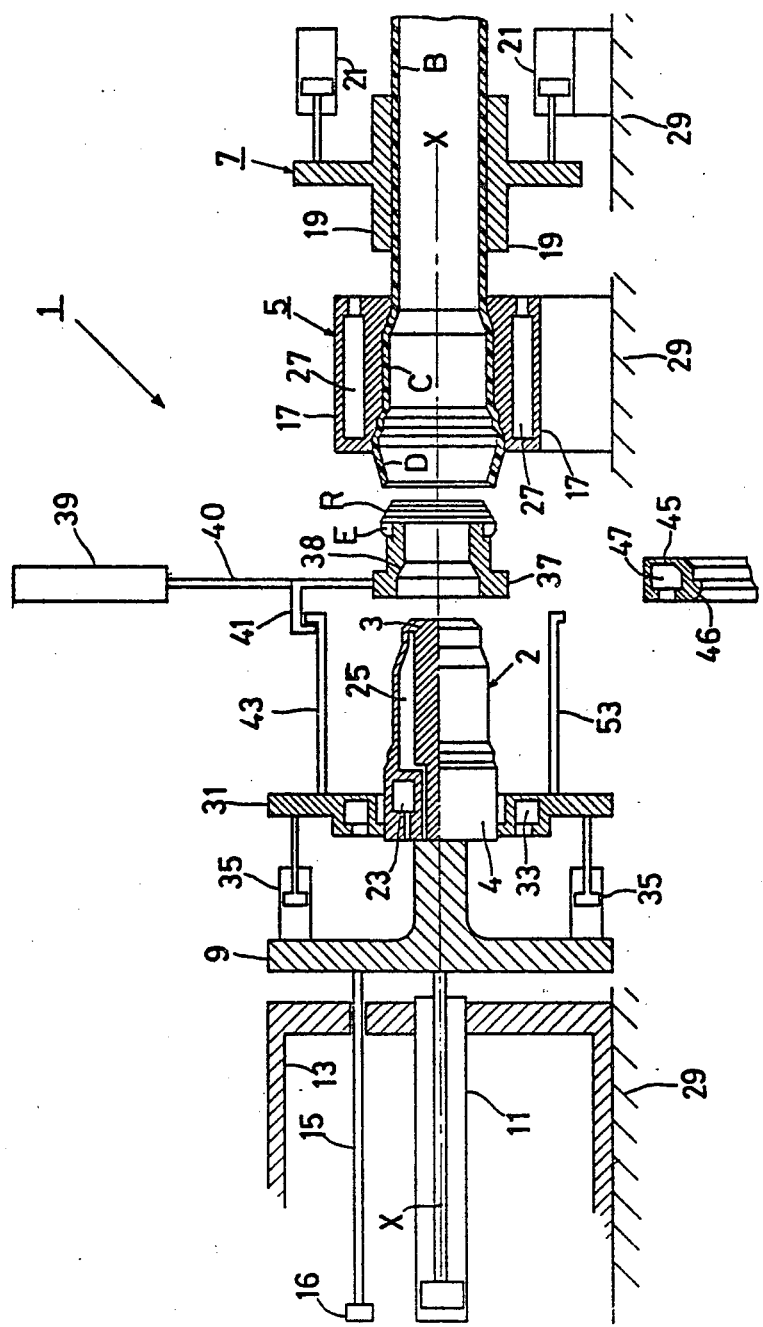
FIGS. 8, 9 and 10 are views, in elevation and in section, of the device according to FIG. 6, in the position before, during and after the introduction of the sealing ring.

When the forming mandrel 2 is withdrawn from the preformed sleeve and is returned to the rest position together with the closing ring, as shown in FIG. 7, the member 37 for introducing the sealing ring, which member is provided with a sealing ring placed on its support surface 36, is displaced radially by means of the hydraulic cylinder 39 and the connecting rod 40 so that it takes up a position between the end of the forming mandrel 2 and the forming sheath 5, as shown in FIG. 8. In this intermediate position, the axis of this member virtually coincides with the axis XX of the device.

Figure 9:
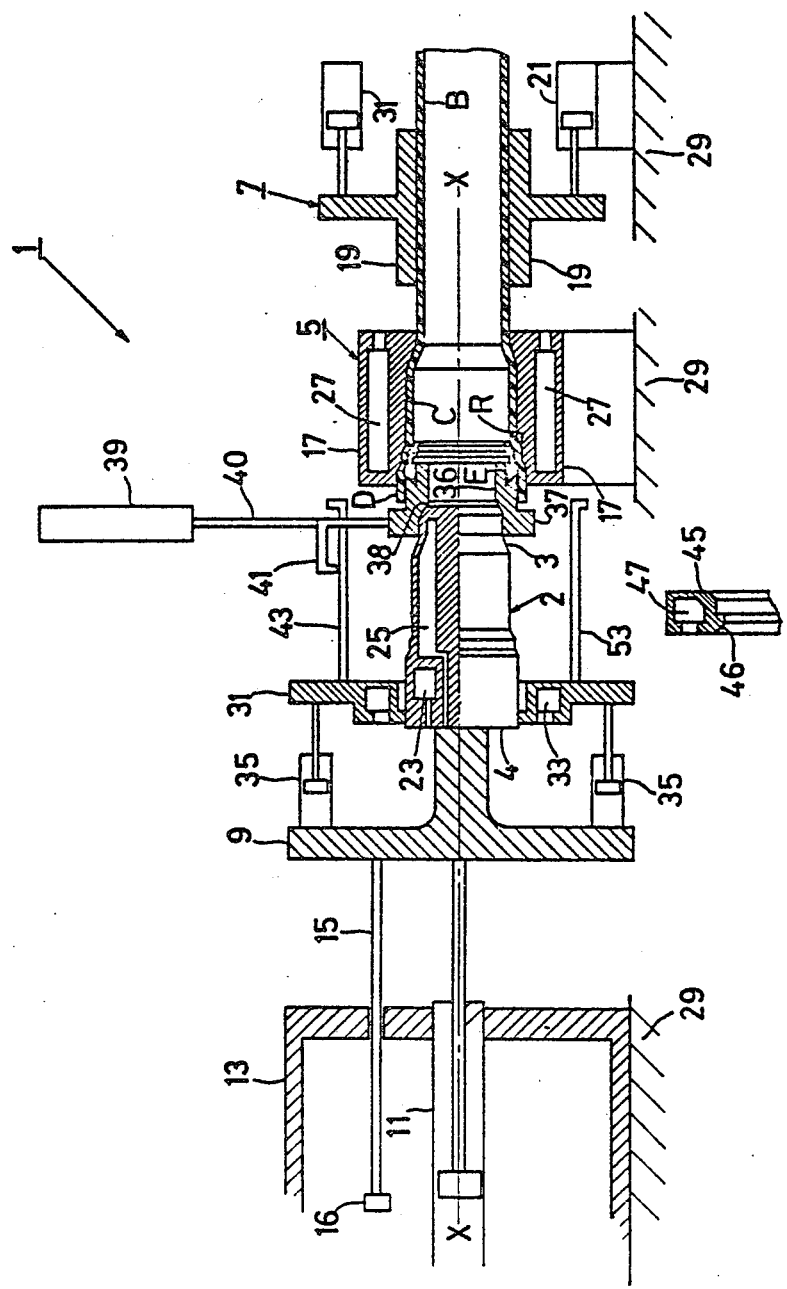

Subsequently, the forming mandrel 2 and the closing ring 31 are again displaced in the direction of the forming sheath 5. Thus, the free end 3 of the forming mandrel 2 comes into contact with the annular bearing surface 38 on the internal circumference of the member 37 for introducing the sealing ring, and this member is pushed into the preformed sleeve C by the forming mandrel 2. Thus, the sealing ring R is pressed into the terminal part D of the preformed sleeve C, as shown in FIG. 9.

By virtue of the fact that the free end 3 of the forming mandrel 2 and the bearing surface 38 of the member 37 for introducing the sealing ring are of conical shape, this member 37 is perfectly centred during this displacement.

Subsequently, the forming mandrel 2 and the closing ring 31 are again displaced into the rest position and the member 37 for introducing the sealing ring is thus withdrawn from the preformed sleeve C by cooperation between the carrying members 41 and 43, leaving the sealing ring R in the said sleeve, and this member 37 is returned to the intermediate position already described. The member 37 for introducing the sealing ring can then be returned to the rest position by controlled radial displacement by means of the hydraulic cylinder 39.

Figure 10:
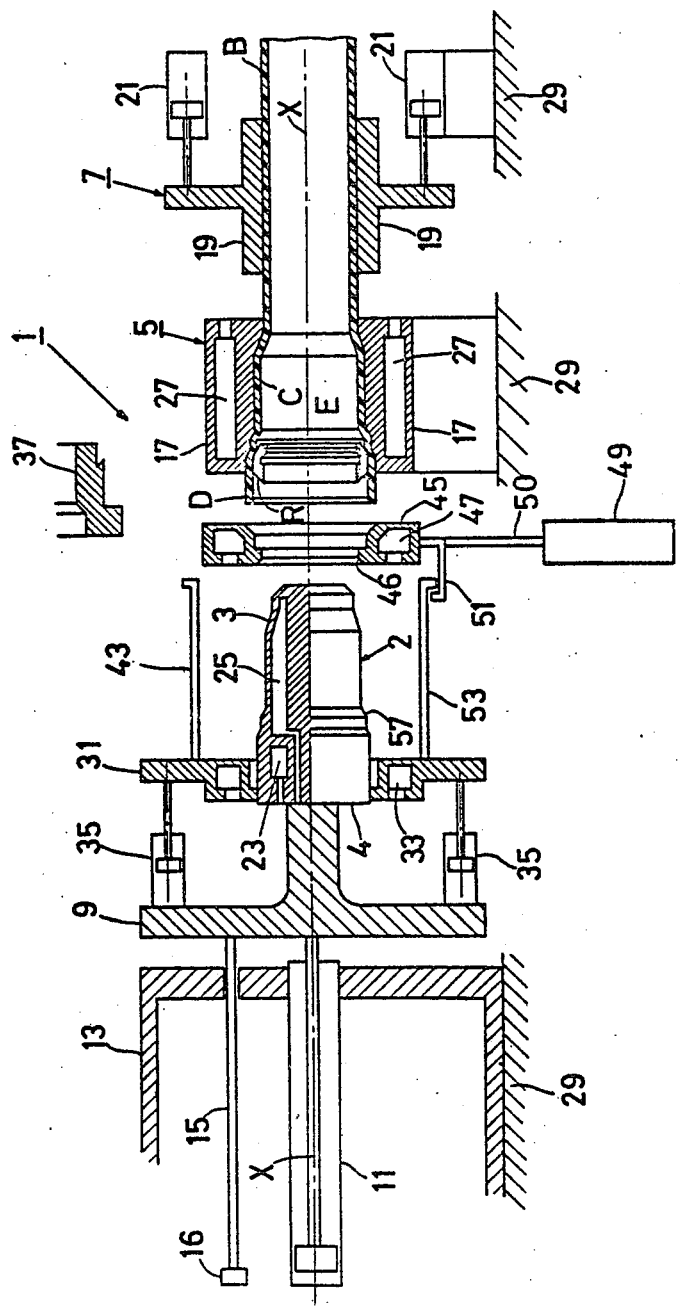

The postforming ring 45 is then inserted in the free space between the forming mandrel 2 and the forming sheath 5 by a radial displacement caused by the hydraulic cylinder 49 and the connecting rod 50. In this position, which is illustrated in FIG. 10, the axis of the closing ring virtually coincides with the axis XX of the apparatus.

Figure 11:
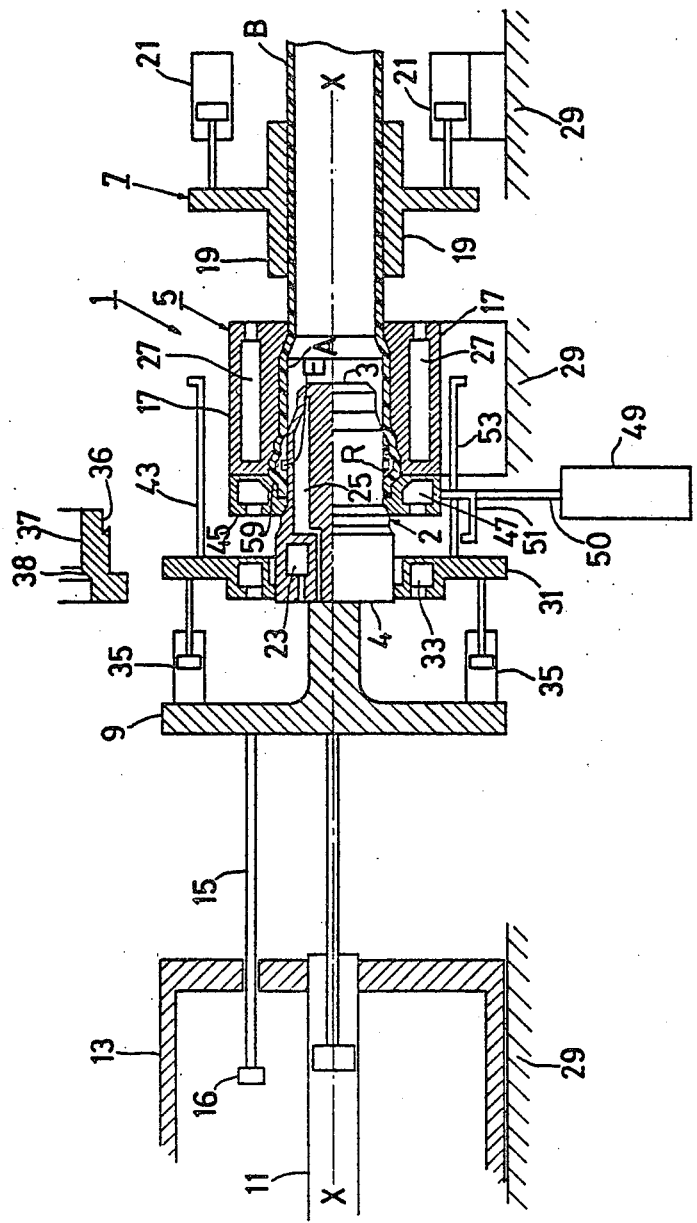
FIG. 11 is a view, in elevation and in section, of the device according to FIG. 6, during the postforming of the terminal part of the sleeve.

Subsequently, the forming mandrel 2 and the closing ring 31 are again displaced axially in the direction of the forming sheath 5. Thus, the surface 57 of the external circumference of the forming mandrel 2 comes into contact with the bearing surface 46 of the postforming ring 45, and this ring is carried by the forming mandrel 2 from the intermediate position illustrated in FIG. 10 to the working position illustrated in FIG. 11, in which working position the forming mandrel 2 and the postforming ring 45 delimit a postforming space 59. During this displacement, the forming mandrel 2 penetrates into the preformed sleeve C, and the sealing ring R located in the sleeve comes to rest around this mandrel. Subsequently, the internal circumference of the postforming ring 45 comes into contact with the terminal part D, which is still hot, of the preformed sleeve C, with the result that this part is postformed around the sealing ring R and in the space 59. During this postforming, the postforming ring 45 is cooled by a fluid circulating in the chamber 47 with the result that the postformed terminal part of the sleeve is cooled and becomes undeformable. FIG. 11 shows the coupling piece A which is finally obtained, together with the sealing ring R held definitively in position.

Finally, the forming mandrel is definitively withdrawn from the postformed coupling piece A and is returned to the rest position together with the closing ring 31. Conjointly, the postforming ring 45 is returned to the intermediate position by cooperation between the carrying members 51 and 53. This postforming ring 45 can then be returned to the rest position by a radial displacement by means of the hydraulic cylinder 49 and the connecting rod 50. After opening the forming sheath 5 and the clamping collar 7, the coupling piece can be removed from the device. This device is then in the starting position and, after reheating the preforming pieces, namely the mandrel and the sheath, it can begin a further treatment cycle.

The device described above is particularly suitable for the forming of coupling pieces, the wall thickness of which is relatively high and/or in which the wall thinning, due to the increase in diameter, must be compensated or over-compensated.

Figure 12:
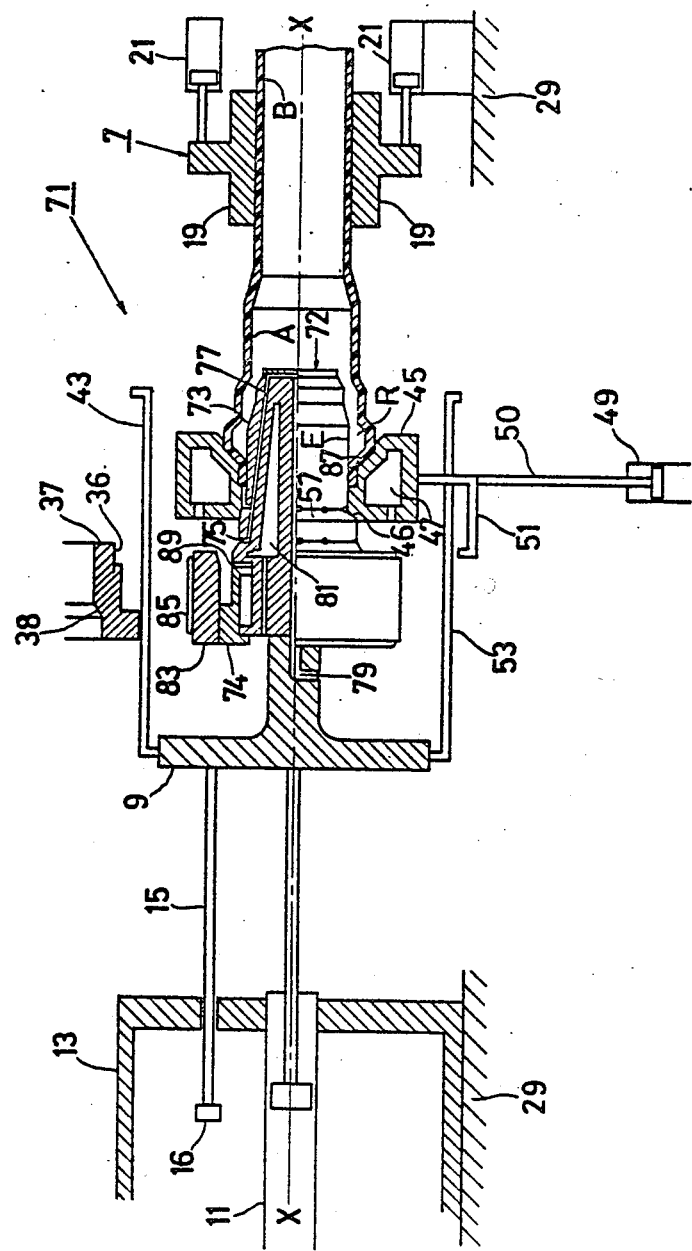
FIG. 12 is a view, in elevation and in section, of another embodiment of the device according to the invention, which embodiment makes it possible to position a sealing ring.

For the forming of coupling pieces which have a relatively low wall thickness and/or for which it is not necessary to compensate the reduction in wall thickness, it is possible, in order to produce pieces equipped with a sealing ring, to use a device such as that shown in FIG. 12, which device is in fact derived from those described in FIG. 5 and in FIGS. 6–11.

This device does not comprise a forming sheath but, on the other hand, the forming mandrel 72 with which it is equipped is identical to that of the device according to FIG. 5 because it possesses channels 75 which emerge on its periphery and can be connected to a source of vacuum which is not shown.

The device according to FIG. 12 is distinguished from the device according to FIG. 5 only by the presence of a member 37 for introducing the sealing ring, which member is identical to that with which the device according to FIGS. 6–11 is equipped.

With this device, the sleeve is preformed pneumatically in the same manner as that explained with reference to the device according to FIG. 5.

After withdrawing the forming mandrel 72 from the preformed sleeve, the member 37 for introducing the sealing ring positions the sealing ring R in the preformed sleeve and leaves it in the said sleeve in accordance with an identical working cycle to that which has been described with reference to the device according to FIGS. 6–11 and which is illustrated in FIGS. 7–9. Subsequently, the terminal part of the preformed sleeve, which terminal part is kept in the deformable state, is postformed around the sealing ring R by means of the postforming ring 45 which operates in accordance with an analogous working cycle to that described with reference to the device according to FIGS. 6–11.

FIG. 12 shows the device in the postforming stage corresponding to that, described with reference to FIG. 11, of the preceding device.

The described embodiments of the process and the device according to the invention relate to the production of a coupling piece on the end of a pipe made of a thermoplastic. However, it is quite obvious that the invention can make it possible to produce any type of coupling piece.

FIGS. 13 to 17 show various types of coupling pieces which can be obtained in accordance with the process of the invention and in which the sealing elements R are shown in broken lines.

Figure 13:
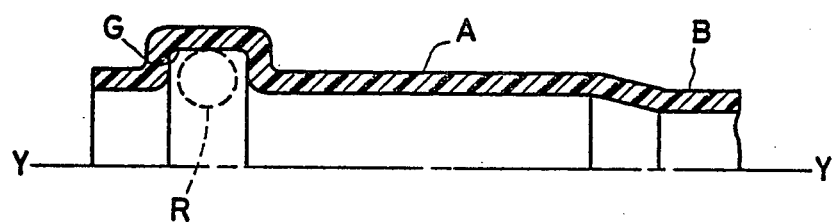
FIGS. 13 to 17 are views, in elevation and in section, of various types of coupling pieces which can be produced by means of the process according to the present invention.

The coupling piece shown in FIG. 13 possesses an undercut annular groove G in the moulded sleeve A on the pipe B, in which groove a conventional O-ring can be inserted as the sealing element R.

Figure 14:
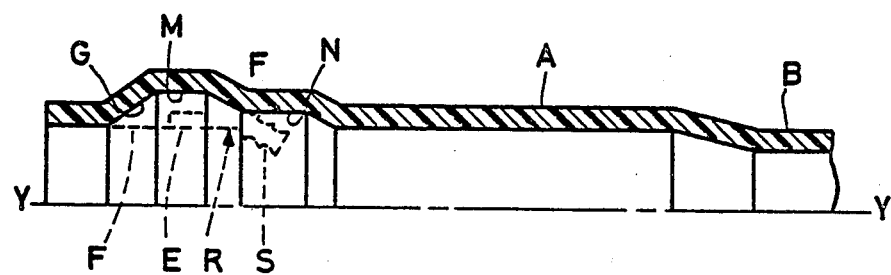

The annular groove G illustrated in FIG. 14 comprises two cylindrical parts M and N of different diameters and is designed for use with a sealing ring R which is equipped with a support ring E and a sealing lip S.

Figure 15:
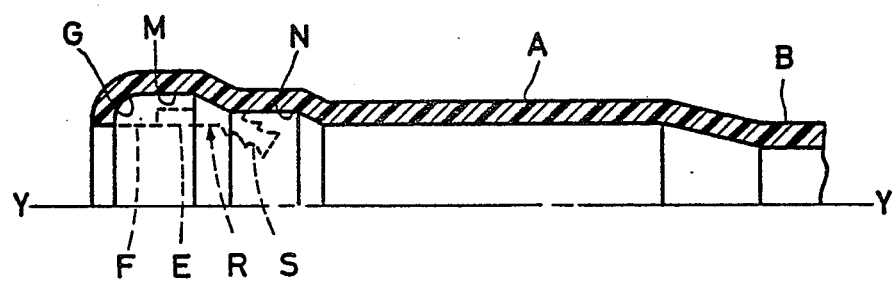

The coupling piece illustrated in FIG. 15 also possesses an extended annular groove G and is designed for use with a sealing ring R which is fixed by means of a support ring E. In this embodiment, the open end of the sleeve is postformed around the sealing ring.

Figure 16:
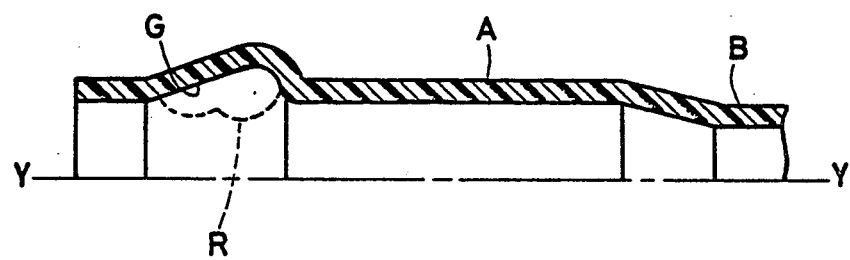
Figure 17:
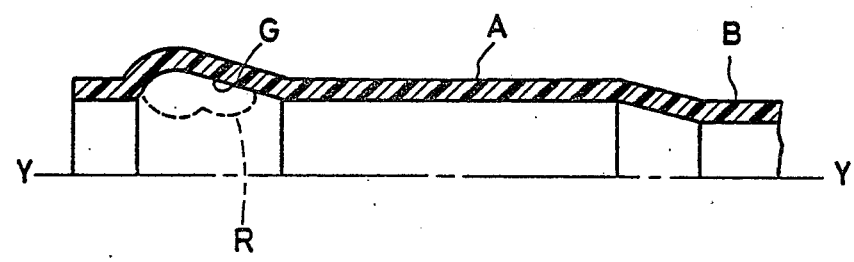

FIGS. 16 and 17 show two embodiments of coupling pieces which can be used with a sealing ring of the type shown.

We claim:

1. Process for the production of coupling pieces from a thermoplastic, which coupling pieces possess an undercut annular groove, in which process a sleeve having a free end and a terminal part adjacent the free end is initially preformed on the end of a pipe of thermoplastic material to have an internal diameter which increases in steps in the direction of the free end, the terminal part of the preformed sleeve is then postformed in order to form the undercut annular groove and, finally, the postformed sleeve is cooled, characterised in that, at the completion of preforming, the terminal part of the preformed sleeve is kept at a temperature which is such that the said terminal part remains elastically deformable, in order to permit postforming of the preformed sleeve, whilst the remainder of the preformed sleeve is cooled to a temperature which is such that the said remainder is no longer deformable.

2. Process according to claim 1, characterised in that a sealing ring is introduced into the terminal part of the preformed sleeve, and in that this terminal part is postformed around the sealing ring in order to obtain a coupling piece in which the sealing ring is enclosed in the undercut annular groove.

3. Process according to claim 1 or 2 characterised in that the undercut annular groove has a region of maximum diameter and the terminal part of the sleeve is located between the free end and the region of maximum diameter of the undercut annular groove.

4. Process according to claim 1 or 2 characterised in that the terminal part is postformed by deforming it radially inwardly.

* * * * *